US012767239B2

(12) United States Patent
Mizusawa

(10) Patent No.: US 12,767,239 B2
(45) Date of Patent: Oct. 20, 2026

(54) FENDER LINER AND VEHICLE FRONT STRUCTURE

(71) Applicant: TOYOTA JIDOSHA KABUSHIKI KAISHA, Toyota (JP)

(72) Inventor: Fumihiko Mizusawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 18/666,923

(22) Filed: May 17, 2024

(65) Prior Publication Data

US 2025/0128769 A1 Apr. 24, 2025

(30) Foreign Application Priority Data

Oct. 19, 2023 (JP) ................................ 2023-180533

(51) Int. Cl.
*B62D 25/18* (2006.01)

(52) U.S. Cl.
CPC .................................... *B62D 25/18* (2013.01)

(58) Field of Classification Search
CPC ...... B62D 25/18; B62D 25/188; B62D 25/08; B62D 25/16; B62D 25/161; B62D 25/163
See application file for complete search history.

(56) References Cited

U.S. PATENT DOCUMENTS

| | | | | |
|---|---|---|---|---|
| 8,146,987 | B2 * | 4/2012 | Uchino | B62D 25/16 296/198 |
| 8,162,380 | B2 * | 4/2012 | Sumitani | B62D 37/02 296/180.1 |
| 10,336,376 | B2 * | 7/2019 | Maruyama | B62D 21/11 |
| 10,981,605 | B2 * | 4/2021 | Kishima | B62D 25/18 |
| 2024/0001996 | A1 * | 1/2024 | Rupp | B62D 25/163 |

FOREIGN PATENT DOCUMENTS

| | | | |
|---|---|---|---|
| JP | 2017-114149 A | | 6/2017 |
| JP | 2021172126 A | * | 11/2021 |

* cited by examiner

*Primary Examiner* — John D Walters
(74) *Attorney, Agent, or Firm* — SoraIP, Inc.

(57) ABSTRACT

The fender liner includes a front fender liner disposed on a vehicle front side of a wheel house sheet metal having a suspension tower, and a rear edge portion overlapping a vehicle lower side of a front edge portion of the wheel house sheet metal. At a rear edge portion of the front fender liner on the vehicle front side of the suspension tower, a bead protruding toward the vehicle upper side and extending in the vehicle width direction and bent toward the vehicle rear side in a plan view is formed.

1 Claim, 5 Drawing Sheets

FENDER LINER AND VEHICLE FRONT STRUCTURE

CROSS-REFERENCE TO RELATED APPLICATION

This application claims priority to Japanese Patent Application No. 2023-180533 filed on Oct. 19, 2023, incorporated herein by reference in its entirety.

BACKGROUND

1. Technical Field

The present disclosure relates to a vehicle front structure, and more particularly to a fender liner.

2. Description of Related Art

Japanese Unexamined Patent Application Publication No. 2021-172126 (JP 2021-172126 A) discloses a vehicle front structure including a front fender liner that covers a front wheel disposed at the front portion of a vehicle along the circumferential direction of the front wheel, and a splash shield which covers the front portion of the front wheel from the inner side in the vehicle width direction and against which the inside bent portion of the front fender liner abuts from the outer side in the vehicle width direction. The splash shield includes a rib that extends along the vehicle up-down direction adjacent to an abutment portion against which the inside bent portion of the front fender liner abuts. Accordingly, even when the splash shield is pressed inward in the vehicle width direction by a water pressure, entry of water droplets into an engine compartment is suppressed.

SUMMARY

A wheel house sheet metal that includes a suspension tower, for example, is disposed on the vehicle rear side of the front fender liner. The rear edge portion of the front fender liner is disposed so as to overlap, on the vehicle lower side, the front edge portion of the wheel house sheet metal. Since a gap exists between the front edge portion of the wheel house sheet metal and the rear edge portion of the front fender liner, muddy water or the like splashed up by the rotation of the front wheel may enter a front compartment such as the engine compartment through the gap. When dirt such as muddy water that has entered the front compartment adheres to the upper surface of the front fender liner, the dirt is seen when a user opens a front hood, deteriorating the appearance. In a battery electric vehicle in which the inside of the front compartment is simplified as compared with an internal combustion engine vehicle, in particular, dirt adhering to the upper surface of the front fender liner is less likely to be hidden by harnesses and tanks, deteriorating the appearance to a greater degree. If a sealing material is added between the front fender liner and the wheel house sheet metal or if a cover for concealing dirt is added in order to suppress the deterioration in the appearance, for example, the cost may be increased.

In view of the above, it is an object of the present disclosure to provide a fender liner and a vehicle front structure capable of avoiding or suppressing the deterioration in the appearance due to adhesion of muddy water or the like to an upper surface of a front fender liner without the addition of a sealing material or the like.

A first aspect provides a fender liner including a front fender liner disposed on a vehicle front side of a wheel house sheet metal including a suspension tower, a rear edge portion of the front fender liner being disposed so as to overlap, on a vehicle lower side, a front edge portion of the wheel house sheet metal, in which a bead is formed at the rear edge portion of the front fender liner on the vehicle front side of the suspension tower, the bead protruding toward a vehicle upper side, extending in a vehicle width direction, and being curved to be convex toward a vehicle rear side in a plan view.

With the fender liner according to the first aspect, the front fender liner is disposed on the vehicle front side of the wheel house sheet metal including the suspension tower. The rear edge portion of the front fender liner is disposed so as to overlap, on the vehicle lower side, the front edge portion of the wheel house sheet metal. A bead is formed at the rear edge portion of the front fender liner on the vehicle front side of the suspension tower. The bead protrudes toward the vehicle upper side, extends in the vehicle width direction, and is curved to be convex toward the vehicle rear side in a plan view. Therefore, when muddy water or the like splashed up by the rotation of a wheel in the wheel house enters a gap between the front edge portion of the wheel house sheet metal and the rear edge portion of the front fender liner, the muddy water or the like flows toward both sides in the vehicle width direction along the bead. Accordingly, it is possible to avoid or suppress muddy water or the like from adhering to the upper surface of the front fender liner on the vehicle front side of the bead. As a result, it is possible to avoid or suppress the deterioration in the appearance due to adhesion of muddy water or the like to the upper surface of the front fender liner without the addition of a sealing material or the like.

A second aspect provides the fender liner according to the first aspect, in which a rib and a flange are formed at the rear edge portion of the front fender liner on the vehicle rear side with respect to the bead, the rib facing a vertical wall from the vehicle rear side, the vertical wall being provided at the front edge portion of the wheel house sheet metal, and the flange extending from an upper end of the rib toward the vehicle rear side and facing an upper wall from the vehicle lower side, the upper wall extending from an upper end of the vertical wall of the wheel house sheet metal toward the vehicle rear side.

With the fender liner according to the second aspect, a rib is formed at the rear edge portion of the front fender liner on the vehicle rear side with respect to the bead. The rib faces a vertical wall from the vehicle rear side, the vertical wall being provided at the front edge portion of the wheel house sheet metal. A flange extends from the upper end of the rib toward the vehicle rear side. The flange faces an upper wall from the vehicle lower side, the upper wall extending from the upper end of the vertical wall of the wheel house sheet metal toward the vehicle rear side. The rib and the flange can directly suppress the entry of muddy water or the like into the gap between the front edge portion of the wheel house sheet metal and the rear edge portion of the front fender liner. Further, even when muddy water or the like enters the gap, the muddy water or the like flows between the upper wall and the vertical wall and the flange and the rib, reducing the flow velocity of the muddy water or the like. As a result, it is difficult for the muddy water or the like to overcome the bead, and thus it is possible to further avoid or suppress the muddy water or the like from adhering to the upper surface of the front fender liner on the vehicle front side of the bead.

A third aspect provides a vehicle front structure including:

a wheel house sheet metal including a suspension tower; and the fender liner according to the first or second aspect, in which a rear edge portion of the front fender liner is disposed so as to overlap, on a vehicle lower side, a front edge portion of the wheel house sheet metal.

In the third aspect, the rear edge portion of the front fender liner is disposed so as to overlap, on the vehicle lower side, the front edge portion of the wheel house sheet metal including the suspension tower. Since the front fender liner is of the first or second aspect, the effects described above can be obtained.

According to the present disclosure, as described above, it is possible to avoid or suppress the deterioration in the appearance due to adhesion of muddy water or the like to an upper surface of a front fender liner without the addition of a sealing material or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a cross-sectional view corresponding to FIG. 4 for explaining a flow of muddy water or the like.

DETAILED DESCRIPTION OF EMBODIMENTS

Figure 1:
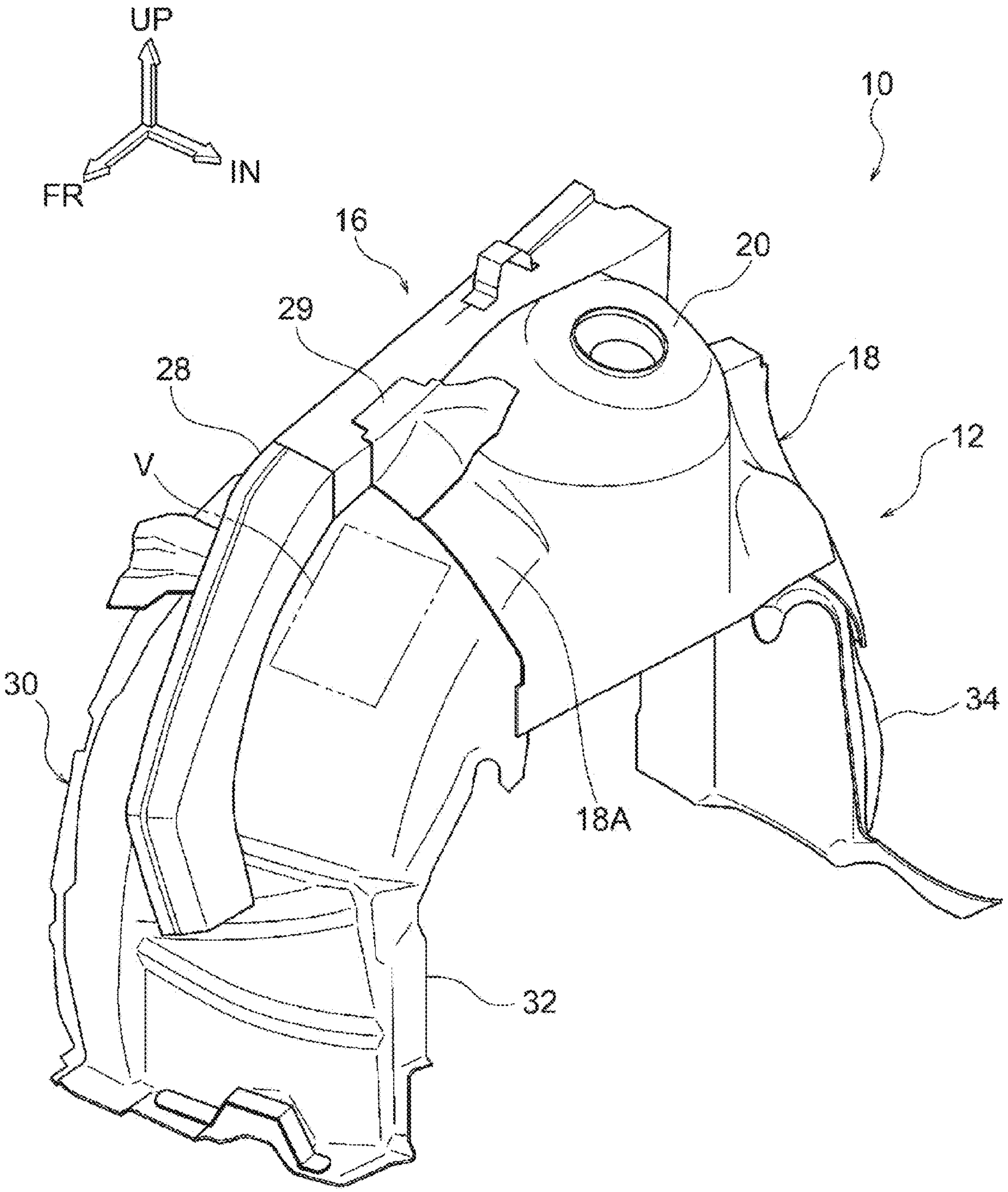
FIG. 1 is a perspective view illustrating a vehicle front structure according to an embodiment.

Hereinafter, the vehicle front structure 10 according to the embodiment of the present disclosure will be described with reference to FIGS. 1 to 5. In each drawing, some reference signs may be omitted in order to make the drawings easier to see. The arrow FR, the arrow UP, the arrow IN, and the arrow OUT shown in the drawings indicate the forward direction (traveling direction), the upward direction, the inward direction in the width direction (left-right direction), and the outward direction in the width direction, respectively. In the following description, the directions of front, rear, left, right, and up and down will be referred to as directions with respect to the vehicle unless otherwise specified.

Figure 2:
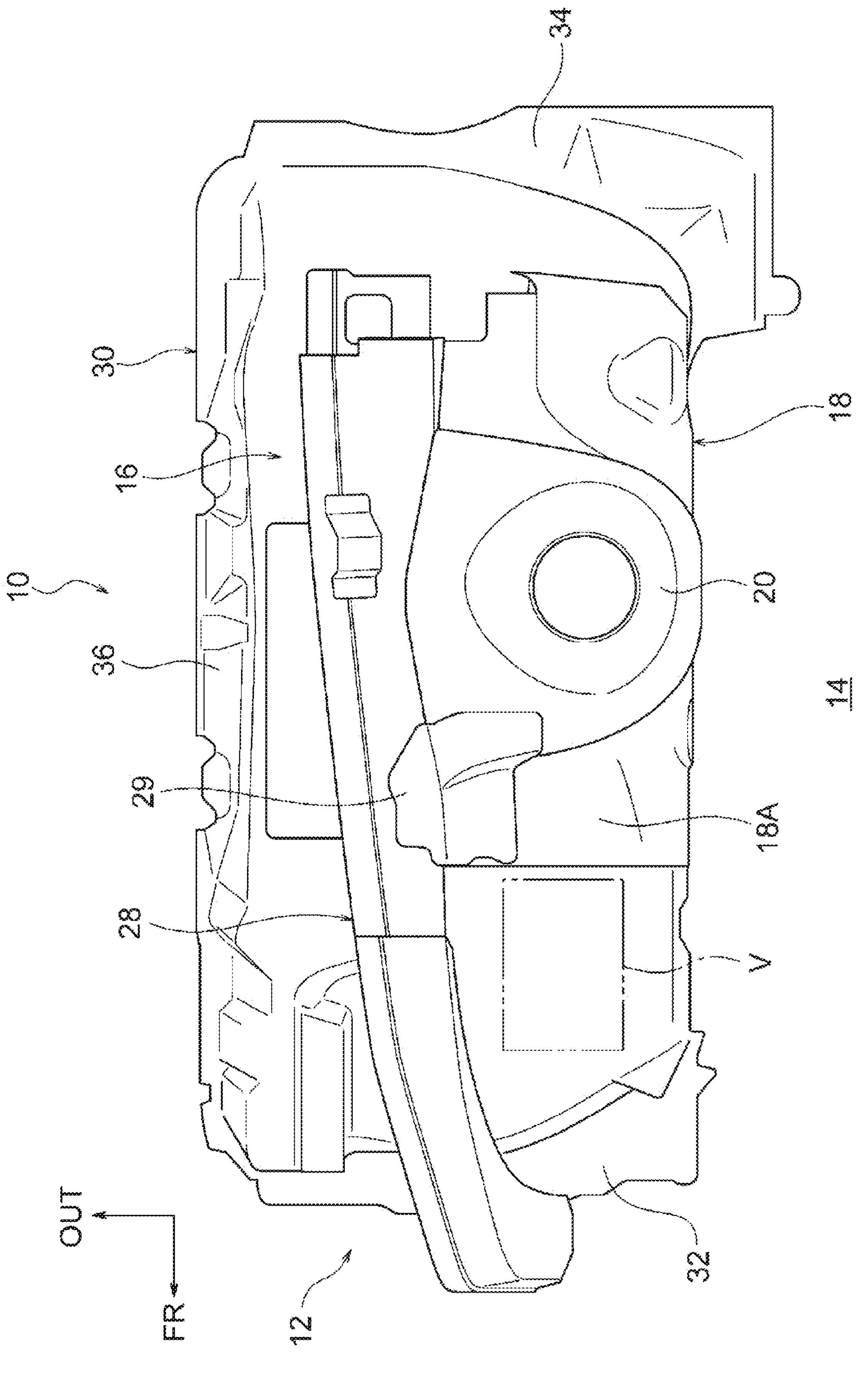
FIG. 2 is a plan view illustrating a vehicle front structure according to the embodiment.

As shown in FIGS. 1 and 2, the vehicle front structure 10 according to the present embodiment constitutes, as an example, a wheel house 12 in front of the right of the vehicle, and includes a wheel house sheet metal 18 having a suspension tower 20 and a fender liner 30. The vehicle front structure 10 is disposed on the vehicle width direction outer side (right side in this case) with respect to the front compartment 14 (not shown in FIG. 1) of the vehicle. The front compartment 14 houses an engine or a motor (not shown) which is a driving source of the vehicle. When the vehicle front structure 10 constitutes a wheel house on the left side of the vehicle, the structure is symmetrical with respect to the present embodiment.

The wheel house sheet metal 18 is formed of, for example, a press-formed steel sheet, and forms a part of the front fender 16 on the right side of the vehicle together with the apron upper member 28. The apron upper member 28 is a skeletal member having a closed cross-sectional structure extending in the vehicle front-rear direction, and is configured by joining a plurality of members made of, for example, a press-formed steel plate. A suspension tower 20 to which an upper end portion of a front suspension (not shown) is fixed is provided at a central portion of the wheel house sheet metal 18. In FIG. 1 and FIG. 2, reference numeral 29 denotes a reinforcing panel that is coupled across the front portion of the wheel house sheet metal 18 and the apron upper member 28.

The fender liner 30 is a member for suppressing muddy water or the like that the front wheels of the vehicle (not shown) wind up from entering the wheel house, and is disposed on the lower side of the wheel house sheet metal 18 and the apron upper member 28. The fender liner 30 is, for example, a molded product of a synthetic resin, and is formed in an arch shape. The fender liner 30 is fixed to the wheel house sheet metal 18 and the apron upper member 28 using a clip or the like. An inner end portion of the fender liner 30 in the vehicle width direction is fixed to a fender apron (not shown) using a clip or the like. An outer end portion of the fender liner 30 in the vehicle width direction is fixed to a fender panel (not shown) using a clip or the like.

The fender liner 30 integrally includes a front fender liner 32, a rear fender liner 34, and an outer fender liner 36. The front fender liner 32 is disposed on the front side with respect to the wheel house sheet metal 18. The rear fender liner 34 is disposed on the rear side with respect to the wheel house sheet metal 18. The outer fender liner 36 is disposed on the outer side in the vehicle width direction with respect to the wheel house sheet metal 18. The front fender liner 32 and the rear fender liner 34 are integrally connected by an outer fender liner 36.

On the upper surface of the front fender liner 32, a visible region V is provided on the front side with respect to the wheel house sheet metal 18 and on the inside in the vehicle width direction with respect to the apron upper member 28. The visible region V is a region not covered by harnesses or tanks disposed in the front compartment 14, and is a region visible to the user of the vehicle when the front hood of the vehicle is opened.

Figure 3:
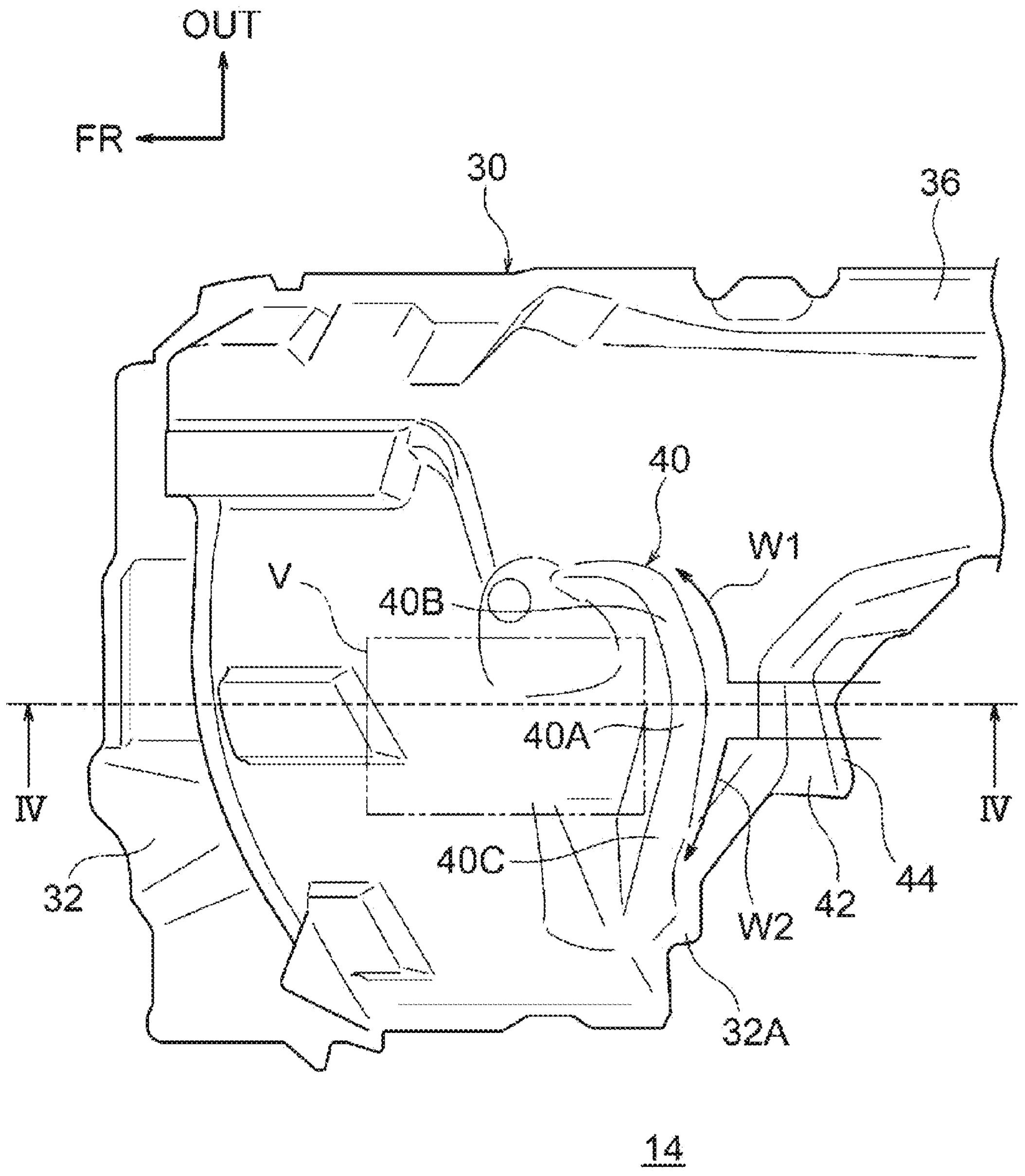
FIG. 3 is a plan view illustrating a part of the fender liner according to the embodiment.
Figure 4:
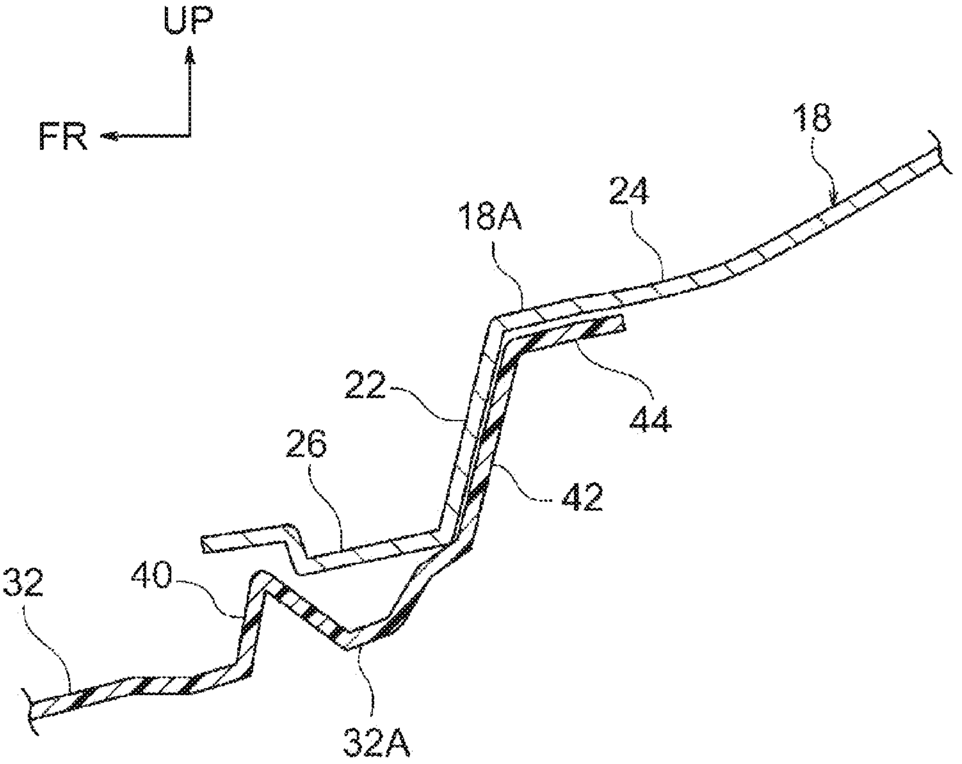
FIG. 4 is a cross-sectional view corresponding to IV-IV line of FIG. 3 showing a part of the vehicle front structure according to the embodiment.
Figure 5:
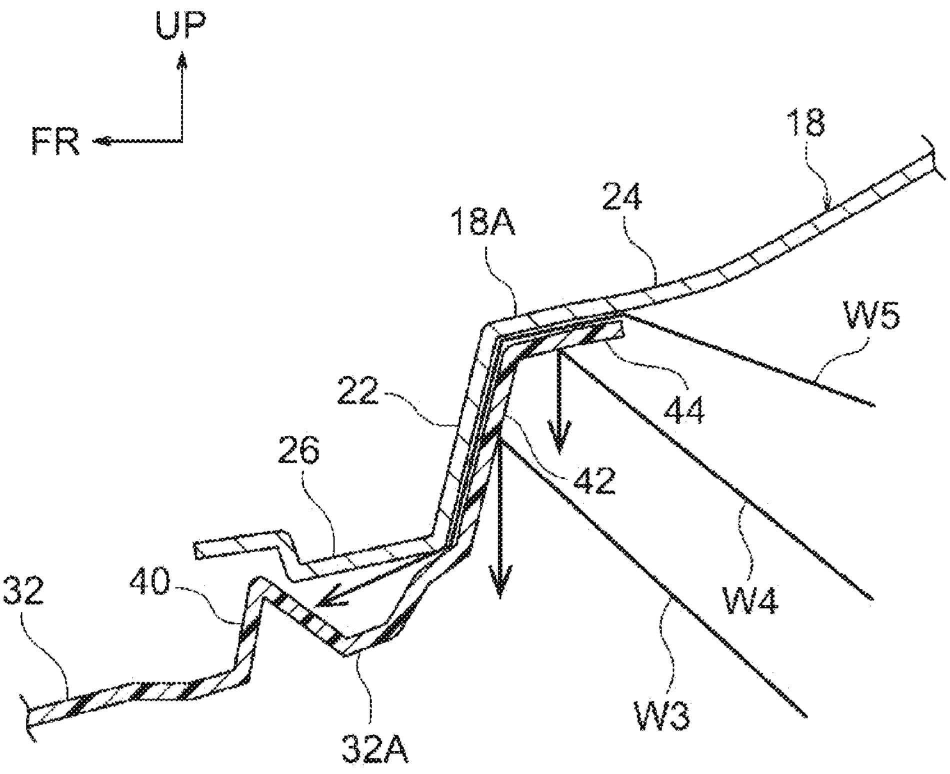

The rear edge portion 32A of the front fender liner 32 (see FIGS. 3 to 5) on the rear side of the visible region V is disposed so as to overlap the lower side of the front edge portion 18A (see FIGS. 1, 2, 4, and 5) of the wheel house sheet metal 18. As shown in FIGS. 3 to 5, a bead 40 is formed on the rear edge portion 32A of the front fender liner 32. In the bead 40, a part of the rear edge portion 32A of the front fender liner 32 protrudes upward and extends in the vehicle-width direction. The bead 40 is bent in a convex manner toward the vehicle rear side in a plan view (bent here), and has a substantially inverted V-shaped cross section in a vehicle width direction view. The bead 40 is covered from above by the front edge portion 18A of the wheel house sheet metal 18.

In the bead 40, the part 40B on the outer side in the vehicle width direction than the bent portion 40A provided in the vehicle width direction center part is inclined or curved so as to be directed toward the vehicle front side toward the vehicle width direction outer side. The partial 40C on the inner side in the vehicle width direction than the bent portion 40A is inclined or curved so as to be directed toward the vehicle front side toward the inner side in the vehicle width direction. On the vehicle width direction outer side of the bent portion 40A, the upper surface of the front fender liner 32 is inclined or curved downward toward the vehicle width direction outer side and the vehicle front side. On the vehicle width direction inner side of the bent portion 40A, the upper surface of the front fender liner 32 is inclined or curved downward toward the vehicle width direction inner side and the vehicle front side.

A rib 42 and a flange 44 are formed on the rear edge portion 32A of the front fender liner 32 on the rear side of the bead 40. The rib 42 is formed by integrally extending a part of the rear edge portion 32A of the front fender liner 32 toward the upper side, and has a plate shape having a substantially front-rear direction as a plate thickness direction. The rib 42 is slightly inclined toward the rear side toward the upper side. The flange 44 integrally extends from the upper end of the rib 42 toward the rear side, and has a plate shape having a substantially vertical direction as a plate thickness direction. The flange 44 is slightly inclined upward toward the rear side.

The ribs 42 and the flanges 44 face the vertical wall 22 and the upper wall 24 provided on the front edge portion 18A of the wheel house sheet metal 18. Like the rib 42, the vertical wall 22 has a plate shape having a substantially front-rear direction as a plate thickness direction, and is slightly inclined toward the rear side toward the upper side. The rib 42 is closely opposed to the vertical wall 22 from the vehicle rear side. The upper wall 24 extends rearward from the upper end of the vertical wall 22. Like the flange 44, the upper wall 24 has a plate shape having a substantially vertical direction as a plate thickness direction, and is slightly inclined toward the upper side toward the rear side. The flange 44 is closely opposed to the upper wall 24 from the lower side.

There is a slight gap between the upper wall 24 and the flange 44 and between the vertical wall 22 and the rib 42. A lower wall 26 extends from the lower end of the vertical wall 22 toward the front side. The lower wall 26 has a plate shape having a substantially vertical direction as a plate thickness direction, and is slightly inclined toward the lower side toward the front side. The bead 40 described above is covered from the upper side by the lower wall 26. There is a slight gap between the bead 40 and the lower wall 26.

Next, operations and effects of the present embodiment will be described. According to the vehicle front structure 10 configured as described above, the front fender liner 32 of the fender liner 30 is disposed on the front side of the wheel house sheet metal 18 having the suspension tower 20. The rear edge portion 32A of the front fender liner 32 is disposed so as to overlap the lower side of the front edge portion 18A of the wheel house sheet metal 18. A bead 40 is formed on the front side of the suspension tower 20 on the rear edge portion 32A of the front fender liner 32. The bead 40 protrudes upward, extends in the vehicle width direction, and is bent so as to be convex toward the rear side in a plan view.

Here, for example, when the vehicle travels in a severe environment such as a flooded road, muddy water or the like wound up by the rotation of the front wheels in the wheel house 12 may enter a gap between the front edge portion 18A of the wheel house sheet metal 18 and the rear edge portion 32A of the front fender liner 32. In such cases, it is possible to prevent or prevent muddy water or the like from adhering to the visible region V of the upper surface of the front fender liner 32 by causing muddy water or the like that has entered the gap to flow along the bead 40 to both sides in the vehicle-width-direction (see the arrow W1, W2 in FIG. 3). As a result, it is possible to prevent or suppress deterioration in appearance due to adhesion of muddy water or the like to the visible region V without the addition of a sealing material, a cover, or the like, and it is possible to avoid an increase in manufacturing cost.

Moreover, in the present embodiment, the ribs 42 are formed on the rear side of the bead 40 on the rear edge portion 32A of the front fender liner 32. The ribs 42 face the vertical wall 22 provided on the front edge portion 18A of the wheel house sheet metal 18 from the rear side. A flange 44 extends rearward from an upper end of the rib 42. The flange 44 faces the upper wall 24 extending rearward from the upper end of the vertical wall 22 of the wheel house sheet metal 18 from the lower side.

By the ribs 42 and the flanges 44 described above, it is possible to directly suppress the intrusion of muddy water or the like into the gap between the front edge portion 18A of the wheel house sheet metal 18 and the rear edge portion 32A of the front fender liner 32 (see the arrow W3, W4 in FIG. 5). Further, even when muddy water or the like enters the gap, the muddy water or the like flows between the upper wall 24 and the flange 44 and between the vertical wall 22 and the rib 42, so that the flow rate of muddy water or the like is reduced (see the arrow W5 in FIG. 5). As a result, the muddy water or the like hardly passes over the bead 40, so that it is possible to further prevent or suppress the muddy water or the like from adhering to the visible region V.

In the above embodiment, the fender liner 30 is configured to integrally include the front fender liner 32, the rear fender liner 34, and the outer fender liner 36, but the present disclosure is not limited thereto. For example, the fender liner may be divided into a front fender liner and a rear fender liner.

In the above-described embodiment, the bead 40 is bent so as to be convex toward the rear side in a plan view, but the present disclosure is not limited thereto, and the bead may be curved so as to be convex toward the rear side in a plan view.

In addition, the present disclosure can be implemented with various modifications without departing from the scope of the disclosure. Further, it goes without saying that the scope of rights of the present disclosure is not limited to the above-described embodiment.

What is claimed is:

1. A fender liner comprising a front fender liner disposed on a vehicle front side of a wheel house sheet metal, wherein a rear edge portion of the front fender liner is disposed so as to overlap, on a vehicle lower side, a front edge portion of the wheel house sheet metal, a suspension tower is provided at wheel house sheet metal, a bead is provided at the rear edge portion of the front fender liner on the vehicle front side of the suspension tower, the bead protruding toward a vehicle upper side, extending in a vehicle width direction, and being curved to be convex toward a vehicle rear side in a plan view, a rib and a flange are provided at the rear edge portion of the front fender liner on the vehicle rear side with respect to the bead, the rib is configured to face a vertical wall from the vehicle rear side, the vertical wall being provided at the front edge portion of the wheel house sheet metal, and the flange is configured to extend from an upper end of the rib toward the vehicle rear side and face an upper wall from the vehicle lower side, the upper wall extending from an upper end of the vertical wall of the wheel house sheet metal toward the vehicle rear side.

* * * * *